(12) United States Patent  (10) Patent No.: US 7,673,325 B2
Vincent et al.  (45) Date of Patent: Mar. 2, 2010

(54) CONFIGURATION OF WIFI NETWORK PARAMETERS

(75) Inventors: Jonathan M. Vincent, Seattle, WA (US); Yuhang Zhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/141,968

(22) Filed: Jun. 1, 2005

(65) Prior Publication Data

US 2006/0173976 A1  Aug. 3, 2006

Related U.S. Application Data

(60) Provisional application No. 60/648,766, filed on Feb. 1, 2005.

(51) Int. Cl.
*G06F 7/04* (2006.01)
*G06F 15/177* (2006.01)

(52) U.S. Cl. .......................... 726/3; 709/220
(58) Field of Classification Search ............. 726/3; 709/220
See application file for complete search history.

(56) References Cited

U.S. PATENT DOCUMENTS 6,898,195 B1 * 5/2005 Molno et al. ............... 370/329
2002/0087704 A1 * 7/2002 Chesnais et al. ........... 709/228
2003/0096614 A1 * 5/2003 Paila .......................... 455/450
2004/0123091 A1 * 6/2004 Das ............................... 713/2
2005/0036509 A1 * 2/2005 Acharya et al. ............. 370/466
2005/0149626 A1 * 7/2005 Manchester et al. ......... 709/220
2005/0193100 A1 * 9/2005 Woolf et al. ................. 709/220
2006/0010437 A1 * 1/2006 Marolia ....................... 717/168
2006/0168438 A1 * 7/2006 Klein ............................ 713/1
2006/0194535 A1 * 8/2006 Houldsworth et al. ...... 455/3.01

OTHER PUBLICATIONS

Open Mobile Alliance, "Firmware Update Management Object", accessible at: http://www.openmobilealliance.org/ftp/Public_documents/DM/Permanent_documents/OMA-TS-DM-FUMO-V1_0-20050822-D.zip, Draft version updated Aug. 22, 2005, 36 pages.

* cited by examiner

*Primary Examiner*—Kambiz Zand
*Assistant Examiner*—Teshome Hailu
(74) *Attorney, Agent, or Firm*—Woodcock Washburn LLP

(57) ABSTRACT

A system and method of configuring network access parameters of a portable computing device is provided. A portable computing device usually includes wireless networking components and may be used with various wireless networks. A configuration server using a device management protocol, such as the OMA-DM protocol, sends network configuration information to a portable computing device. This configuration information includes network parameters such as network identifiers, encryption keys and authentication credentials. The portable computing device then uses the provided parameters to set its configuration information so that it can access a defined wireless network.

21 Claims, 12 Drawing Sheets

CONFIGURATION OF WIFI NETWORK PARAMETERS

CROSS-REFERENCE TO RELATED APPLICATION

This application claims benefit under 35 U.S.C. §119(e) from U.S. Provisional Patent Application Ser. No. 60/648,766, entitled "CONFIGURATION OF WIFI NETWORK PARAMETERS USING OMA DEVICE MANAGEMENT" and filed on Feb. 1, 2005. The entirety of that application is hereby incorporated by reference.

BACKGROUND

Portable computing devices, including laptop computers, personal data assistants (PDAs), and cellular telephones, among others, are increasingly being used to communicate with other computing devices using network connections. Among the most prevalent of network connection types is a wireless network, typically implemented using an IEEE 802.11x protocol, sometimes called WiFi. Other network connection systems include IEEE 802.16 (WiMax) and Bluetooth. In order for these devices to be able to access and communicate over a wireless network, the devices usually have to be pre-configured with a variety of network access parameters including a network identifier and a network key, among others.

The need to pre-configure devices with network access parameters presents at least two problems. First, methods for configuring network access parameters frequently vary from device to device. Second, each device usually has to be configured individually. The task of configuring a large number of devices can be prohibitively time-consuming. The magnitude of both these problems is compounded in cases when a network administrator needs to configure devices to access more than one wireless network. In some cases, a device may be incapable of being configured to access more than one wireless network at a time. Current systems and methods fail to adequately assist network administrators with the task of configuring portable computing devices to access wireless networks.

SUMMARY

The following presents a simplified summary in order to provide a basic understanding. This summary is not an extensive overview. It is neither intended to identify key/critical elements nor to delineate scope. Its sole purpose is to present some concepts in a simplified form as a prelude to the more detailed description later presented. Additionally, section headings used herein are provided merely for convenience and should not be taken as limiting in any way.

A system and method of configuring network access parameters of a portable computing device is provided. A portable computing device includes wireless networking components and may be used with various wireless networks. A configuration server that uses a device management protocol, such as the Open Mobile Alliance Device Management (OMA-DM) protocol, sends network configuration information to a portable computing device. The configuration server can use a transport channel, such as the global system for mobile communication (GSM) or code division multiple access (CDMA) channels, among others, to communicate with the portable computing device. This configuration information includes network parameters such as network identifiers, encryption keys and authentication credentials. The portable computing device can then use the provided parameters to set its configuration information so that it can access a defined wireless network. Systems and techniques provided by the OMA DM protocol can also be employed.

An extensible data model is provided to allow for wireless networks to be uniquely identified and to describe configurable parameters of wireless networking components of a portable computing device. Such parameters may include configurable parameters for vendor-specific device functions or components. In one exemplary implementation, the extensible data model is an extensible markup language (XML) file.

The disclosed and described components and methods comprise the features hereinafter described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such components, methods and their equivalents. Variations of the specific implementations and examples presented herein will become apparent from the following detailed description when considered in conjunction with the drawings.

DETAILED DESCRIPTION

Figure 1:
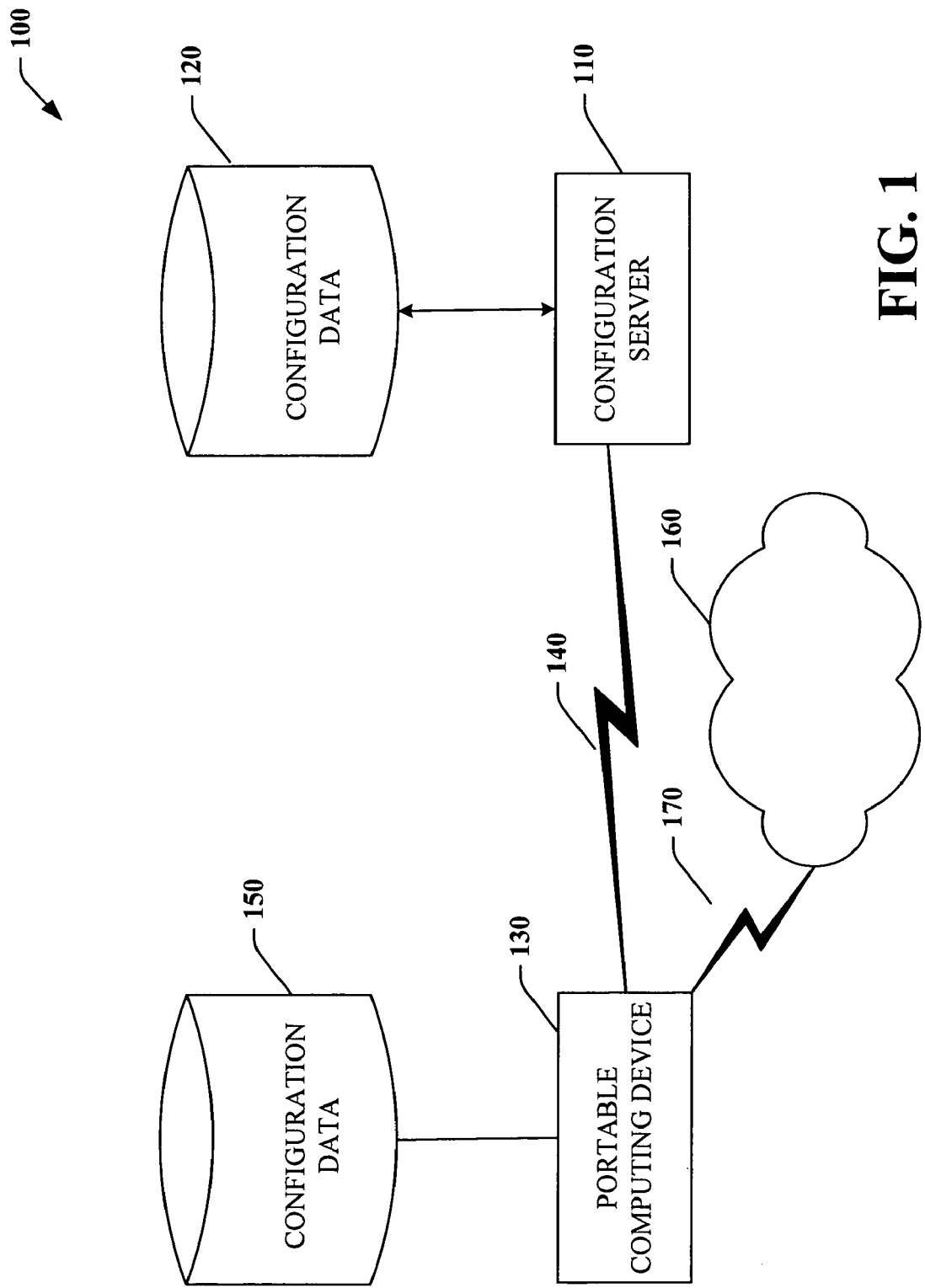
FIG. 1 is a system block diagram of a portable computing device configuration system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

FIG. 1 is a system block diagram that depicts a wireless network configuration system 100. The wireless network configuration system 100 can provide a framework that can be used to configure a portable computing device with parameters or settings to enable the portable computing device to access a wireless network. Such parameters or settings can include access and authentication information, among other information types.

The wireless network configuration system 100 includes a configuration server 110 that has access to a configuration data store 120. The configuration server 110 can be a specialized information server that solely provides configuration information for portable computing devices. Alternatively, the configuration server 110 can be a web server or a file transfer protocol ("FTP") server that has been adapted to function as the configuration server 110. Other types of servers can be adapted to function as the configuration server 110 as well. The configuration server 110 can read portable computing device configuration information from the configuration data store 120 and when appropriate, write updated information to the configuration data store 120. The configuration data store 120 can be a database, a knowledge base, a formatted text file, an extensible markup language ("XML") file, or another suitable means of storing data for use.

The configuration server 110 can communicate with a portable computing device 130 using a communication channel 140. The portable computing device 130 can be any portable device capable of network communication with other devices. Specifically, a portable computing device such as the portable computing device 130 can be a laptop computer, a personal digital assistant ("PDA"), a cellular telephone, a personal information manager ("PIM"), or a similar device. It should be noted that although this and other examples refer to portable computing devices, those of ordinary skill in the art will appreciate that the components and methods presented can also be used in conjunction with stand-alone computers or other computing devices that have networking capabilities.

The communication channel 140 can provide data communication capability between the configuration server 110 and the portable computing device 130. Preferably, the communication channel 140 is a wireless channel such as a short message system (SMS) channel, an IEEE 802.11x (WiFi) channel, an IEEE 802.16 (WiMax) channel, a cellular telephone channel such as a code division multiple access (CDMA) channel, a time division multiple access (TDMA) channel, a global system for mobile communications (GSM) channel, or another suitable wireless channel. However, when appropriate, a wired channel such as an Ethernet, IEEE 1394 (FireWire), universal serial bus (USB), or another suitable wired connection can be employed as the communication channel 140.

The portable computing device 130 can access an internal configuration data store 150. The internal configuration data store 150 includes configuration data, including network access parameters, that can be used by the portable computing device 130 to access a network, such as network 160. The portable computing device 130 is shown connected to the network 160 using a second communication channel 170. The network 160 is preferably a wireless network, such as an IEEE 802.11x network, but can be any suitable network. Correspondingly, the communication channel 170 is preferably a wireless communication channel but can be any suitable channel that can provide access to the network 160.

An example of the wireless network configuration system 100 in operation follows. It should be noted that this example, as well as other examples set forth herein, may refer to specific implementation details or modes of operation. Such examples are not necessarily limited to those details but are merely examples intended to supply context.

The portable computing device 130 accesses the configuration server 110 using the communication channel 140. During such access, the portable computing device 130 requests configuration information for the network 160 from the configuration server 110. The configuration server 110 accesses the configuration data store 120 to obtain the requested configuration information and sends that information to the portable computing device 130 over the communication channel 140.

The portable computing device 130 receives the configuration information from the configuration server 110 and uses that configuration information to update information in the internal configuration data store 150. The portable computing device 150 can then use the updated information in the internal configuration data store 150 to access the network 160 over the communication channel 170.

It should be noted that communication channel 140 and communication channel 170 can be of a similar type, for example, an IEEE 802.11x connection. The communication channel 140 and communication channel 170 can be of different types as well. For example, the communication channel 140 can be an IEEE 802.11x channel and the communication channel 170 can be an IEEE 802.16 channel. Other combinations are possible. Additionally, there can be more than one communication channel 140 and more than one communication channel 170.

The specific example presented above describes an operational mode that can be referred to as a pull system in the sense that a configuration session is initiated by the portable computing device 130 that pulls the required data from the server. A push scenario, such as when a configuration session is initiated by a server, is also possible. For example, the configuration server 110 can send a configuration request signal to the portable computing device 130. The portable computing device 130 can acknowledge the configuration request from the configuration server 110 and prepare to receive configuration data. The acknowledgement of the configuration request can include information regarding a current configuration or capabilities of the portable computing device 130.

Upon receiving an acknowledgement from the portable computing device 130, the configuration server 110 can access appropriate configuration information from the configuration data store 120. The configuration server 110 can send the accessed configuration data to the portable computing device using the communication channel 140. The portable computing device 130 can use the configuration data from the configuration server 110 to update configuration information in the configuration data store 150.

Figure 2:
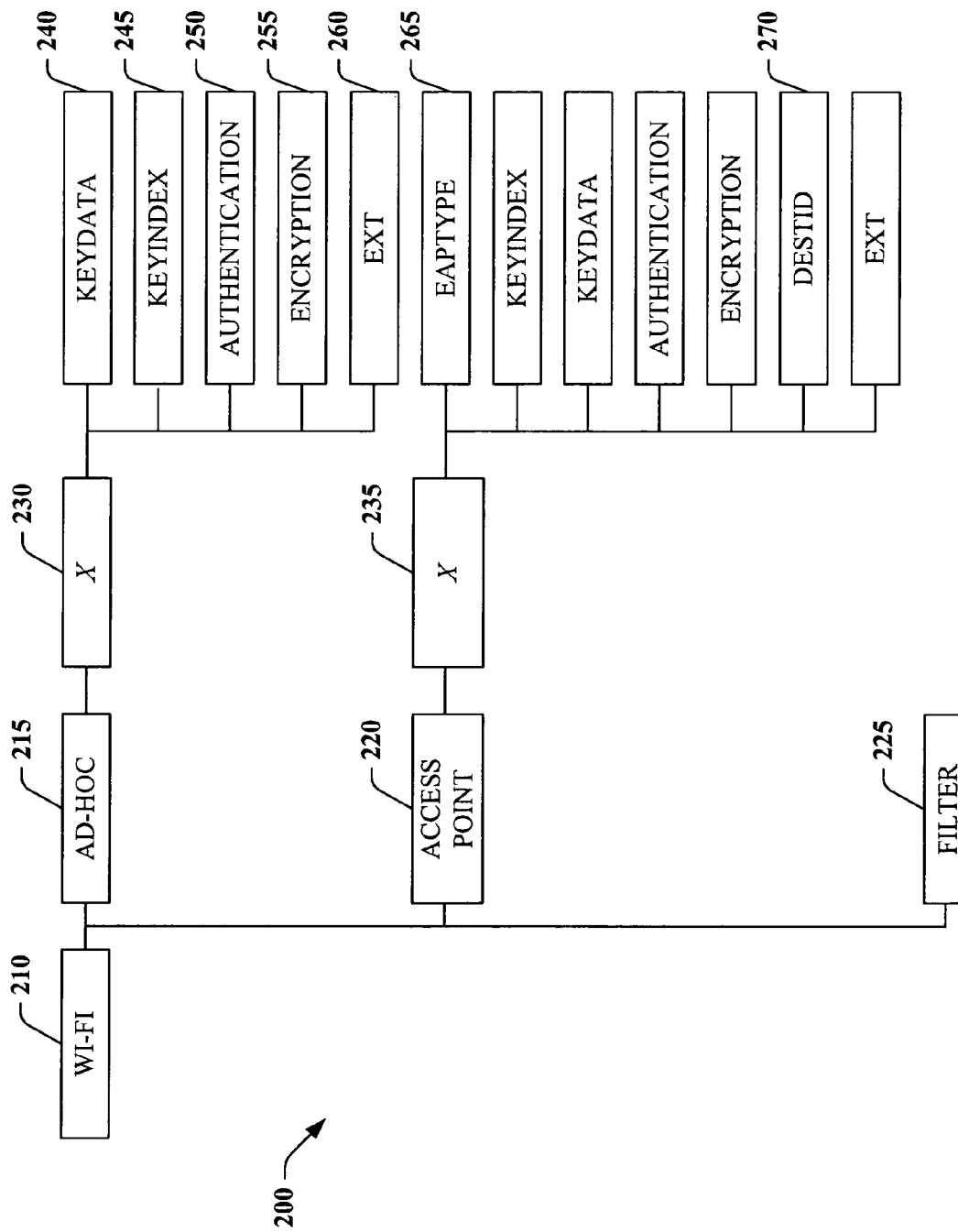
FIG. 2 is a schema diagram of a configuration data structure.

FIG. 2 depicts a schema for a network configuration parameter data structure 200. The network configuration parameter data structure 200 is intended to provide a logical arrangement or format for the provision of network configuration parameter data to a portable computing device. Although a specific base schema is presented, those of ordinary skill in the art will readily recognize that the base schema can be adapted for a specific implementation or extended as desired by an implementer.

The network configuration parameter data structure 200 includes a group of nodes that are arranged in a tree structure that terminates with a group of leaves. The information included in the network configuration parameter data structure 200 preferably includes all information sufficient for a portable computing device configure its settings to enable the portable computing device to access a network. Although a tree structure is used to illustrate details of the network configuration parameter data structure 200, it should be apparent to those of ordinary skill in the art that other data structures, such as a group of encapsulated objects or a linked list, among others, can be used to hold the network configuration parameter data.

In this example of a specific implementation of the subject invention that is based upon the Open Mobile Alliance device management framework, the data must be explicitly organized in a hierarchical structure. The typical representation used is a tree. Following this convention, a root node 210 of the tree of the network configuration parameter data structure 200 includes information that identifies a type of network for which a portable computing device will be configured. In this illustration, the network is an IEEE 802.11x network. Other types of networks can be specified. Preferably, a network identifier included in the root node 210 is a unique identifier that has been predefined in a specific implementation. The identifier can be a human-readable identifier such as a character string, a machine-readable identifier such as a binary code, or another suitable identification type.

At the next level of the network configuration parameter data structure 200, nodes 215, 220 each form a base of a branch of the tree that describes various network types. Among the types of networks described are ad hoc networks and access points, respectively. An ad hoc network includes a network of computing devices that are connected together to transfer information between or among themselves upon demand. Ad hoc networks usually do not have an architecture or topology that lasts beyond a single networking session, although that is not always the case. An access point is generally understood to include a component that acts as a network node that can provide a communication entry point for network traffic to or from a computing device joining a network as a node.

A third node at this level, a filter node 225, includes information that can define the type of network that can be accessed by a portable computing device to be configured. Information included in the filter node 225 can be used to exclude a portable computing device from a network or network type. Similarly, such information can also be used to prevent the portable computing device from obtaining configuration information for a specified network or network type.

When the tree of the network configuration parameter data structure 200 is represented in an extensible markup language (XML) file, the network type can be considered a namespace delimiter. This specific example considers that a network identifier alone is insufficient to uniquely identify a network. Rather, the network identifier is combined with a network type to uniquely identify a particular wireless network. In this manner, the same network identifier can be used with two different network types to describe two distinct and separate networks. Such a scheme can greatly increase the number of unique networks that can be described by the network configuration parameter data structure 200.

An ad hoc node 215 has a sub-tree that includes a network identifier. The network identifier is included in a network identifier node 230. The network identifier node 230 also has a sub-tree that includes a group of leaves. Each leaf node includes parameter information that can be used to access the network that is described by information included in higher-level nodes.

A KeyData leaf 240 includes network-specific key data that can be used to access secure networks. Such keys can include digital certificates, wired equivalent protocol ("WEP") keys, pretty good privacy ("PGP") signatures, or other appropriate keys. Preferably, when a key is employed, messages containing key data are transmitted securely using some encryption protocol such as a symmetric private key, an asymmetric public-private key system, or another suitable system.

A KeyIndex leaf 245 contains a value corresponding to a key index for protocols that support the use of such an index, such as the wired equivalent protocol (WEP). A key index can be used to provide security for the network. As a security precaution, the key index can be a required access parameter and if required or desired, can be included in the KeyIndex leaf 245.

An Authentication leaf 250 can include information that specifies an authentication protocol for a network. A number of possible authentication protocols are possible and can be implementation dependent. Possible values include "open," "shared," "WPA," "WPA-PSK," and "WPA-NONE." An example possible default value is WPA for access point networks. Another possible default value example is WPA-NONE for ad hoc networks. In addition to being dependent upon a specific implementation, these values can also be affected by various network security or access policies set by an administrator.

An Encryption leaf 255 includes information that specifies an encryption protocol for a network. Encryption protocols are usually specified for secure networks or for networks that have some access limitation. Possible values include "none," "WEP," "TKIP," and "AES." A possible exemplary default value is TKIP. In cases when a leaf node is missing or intentionally omitted, any defined default value for the leaf can be used automatically. Automatic use of a default value can be a policy choice made by an implementer or a network administrator.

An Extra leaf 260 is shown as a place where extensions, such as vendor-specific extensions, may be added if desired, either permanently or dynamically. More than one Extra leaf 260 may be used or conversely, the leaf may be omitted entirely. Additionally, more parameters, or more value options may be added to adapt the basic example for new or changed protocols or to access additional features.

An access point node 220 also has a sub-tree that begins with node 235. Node 235 includes a network identifier for an access point type of network. Leaf nodes associated with the node 235 include much of the same kind of information as leaf nodes associated with the node 230. For example, a KeyData leaf that is similar to the KeyData leaf 240 includes network-specific key data typically used to access secure networks. A KeyIndex leaf that is similar to the KeyIndex leaf 245 contains a value corresponding to a key index for protocols that support the use of such an index, such as the wired equivalent protocol (WEP). An Authentication leaf that is similar to the Authentication leaf 250 includes information that specifies an authentication protocol for a network. An Encryption leaf that is similar to the Encryption leaf 255 includes information that specifies an encryption protocol for a network. In cases when a leaf is missing or intentionally omitted, any appropriate defined default value for the leaf may be used automatically.

As shown, an EAPType leaf 265 includes a numeric identifier for an Extensible Authentication Protocol plug-in that may be installed on a portable computing device. If no matching plug-in is installed on the device, configuration of the device will fail. A DestID leaf 270 can identify a network to which a defined wireless network provides access. The accessed network can be identified by a GUID. The GUID can be an alphanumeric identifier, a binary identifier, or another appropriate identifier. Possible values include "Internet" or "intranet," with "Internet" being a possible default.

Any vendor-specific properties can be accommodated using this scheme. For example, at the root XML tag, a namespace for vendor-specific properties can be defined. Following an appropriate namespace definition, each vendor-specific property can be prefixed with an appropriate identifier. Values for each vendor-specific property can be included in appropriate nodes as desired.

Figure 3:
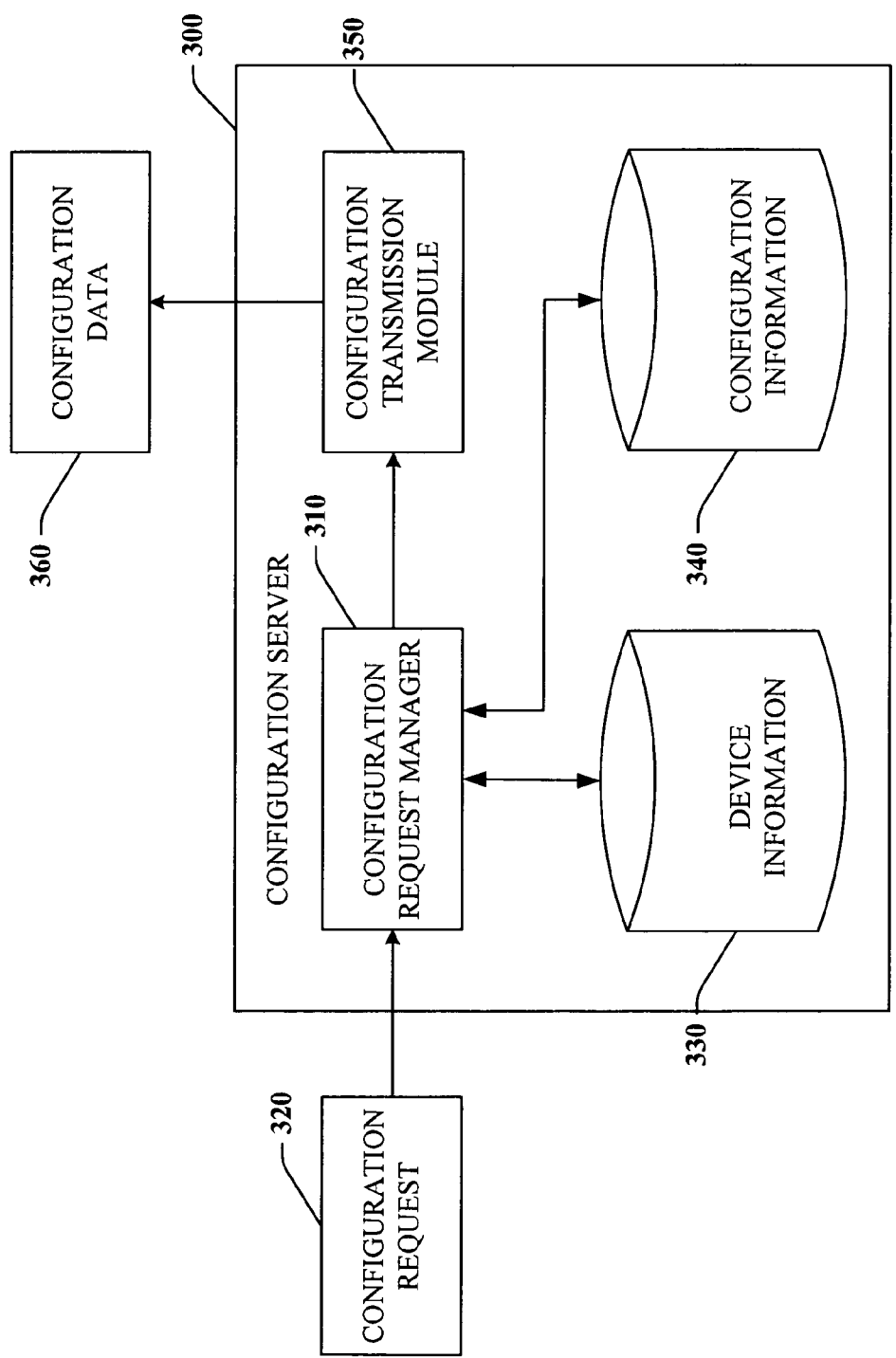
FIG. 3 is a system block diagram of a configuration server.

FIG. 3 is a system block diagram depicting a configuration server 300. The configuration server can provide a framework that can be used to supply configuration information to a portable computing device. The configuration server 300 includes a configuration request manager 310 that can receive a configuration request signal from a portable computing device such as a configuration request signal 320. Upon receiving such a request, the configuration request manager 310 can access a device information data store 330 to obtain any necessary device-specific configuration information. The configuration request manager 310 can also access a configuration information data store 340 to obtain network access parameters for the portable computing device. The configuration request manager 310 can then provide the obtained information to a configuration transmission module 350. The configuration transmission module 350 can arrange the data into a suitable format for transmission and can send the formatted configuration data out to the requesting device. Those of ordinary skill in the art will recognize that as with a previous example and with minor modifications, the components of FIG. 3 can be operated in a push mode as opposed to the pull mode described.

Figure 4:
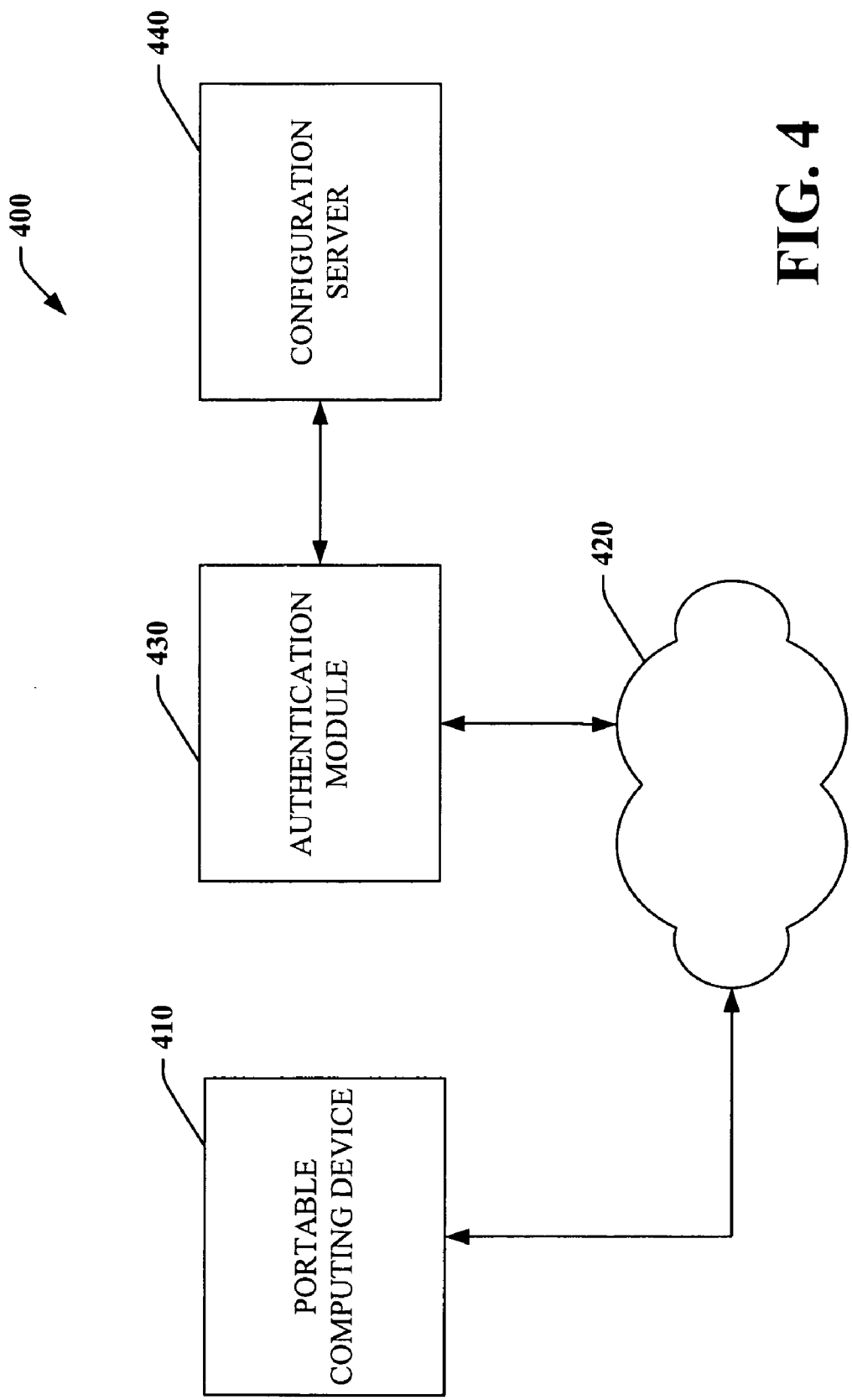
FIG. 4 is a system block diagram of a configuration server system.

FIG. 4 is a system block diagram of a configuration server system 400. The configuration system server system 400 includes a portable computing device 410. The portable computing device 410 can be a cellular telephone, a personal digital assistant, a personal information manager, or another type of portable computing device. The portable computing device 410 can connect to a network 420. The network 420 can be a corporate intranet, the Internet, a wide area network, a local area network, a cellular telephone network, or another network.

An authentication module 430 can provide an authentication services for the configuration server system 400. Specifically, the authentication module 430 can authenticate a user of the portable computing device 410, the portable computing device 410 itself, or both. To authenticate a user of the portable computing device 410, the authentication module 430 can use a variety of or authentication methods. Among those methods are a user name and password system, a security token system, or a biometric system such as a fingerprint or retina scanner. Generally, any authentication system that works on a concept of what a user has, what user knows, or who the user is, can be employed as, or as part of, the authentication module 430.

The authentication module 430 can also authenticate the portable computing device 410 itself. One possible approach to authenticating the portable computing device 410 is to obtain a model number and serial number of the device. Another approach is to assign a global unique identifier to the portable computing device 410 and to maintain a list of all globally unique identifiers that are assigned to approved portable computing devices such as the portable computing device 410. In this manner, once the authentication module 430 has obtained an identifier of the portable computing device 410, the authentication module 430 can compare that identifier against a list of identifiers of approved devices to determine whether to authenticate a specific portable computing device.

The authentication module 430 can access a configuration server 440. The configuration server 440 can be implemented in one of the manners described in conjunction with previous figures. The authentication module 430 can control access by the portable computing device 410 to the configuration server 440 to help ensure that the only authorized devices can obtain configuration information from the configuration server 440.

An example of operation of the configuration server system 400 follows. The portable computing device 410 sends a configuration request over the network 420 to the authentication module 430. The configuration request can include a unique identifier of the portable computing device 410. Alternately, upon receiving a configuration request from the portable computing device 410, the authentication module 430 will send an identification request to the portable computing device 410. The portable computing device 410 will respond to the identification request from the authentication module 430 by sending its unique identifier to the authentication module 430.

The authentication module 430 uses the identifier of the portable computing device 410 to determine whether the portable computing device 410 is an authorized device. If so, the authentication model 430 sends a user authentication request to the portable computing device 410. Depending upon a specific user identification system in use, the user identification information will vary. For example, the user identification may include a user name and password, identifying indicia of a user's fingerprint, identifying indicia of a user's retina, or another appropriate identifier of the user.

When the authentication module 430 has verified both the portable computing device 410 and the user of that device, the authentication module 430 will forward the configuration request to the configuration server 440. The configuration server 440 will then obtain the requested configuration information and send that configuration information over the network 420 to the portable computing device 410. The portable computing device 410 will then use that configuration information to update its internal network access configuration so that it can access a specific network. Those of ordinary skill in the art will recognize that as with a previous example and with minor modifications, the components of FIG. 4 can be operated in a push mode as opposed to the pull mode described.

Figure 5:
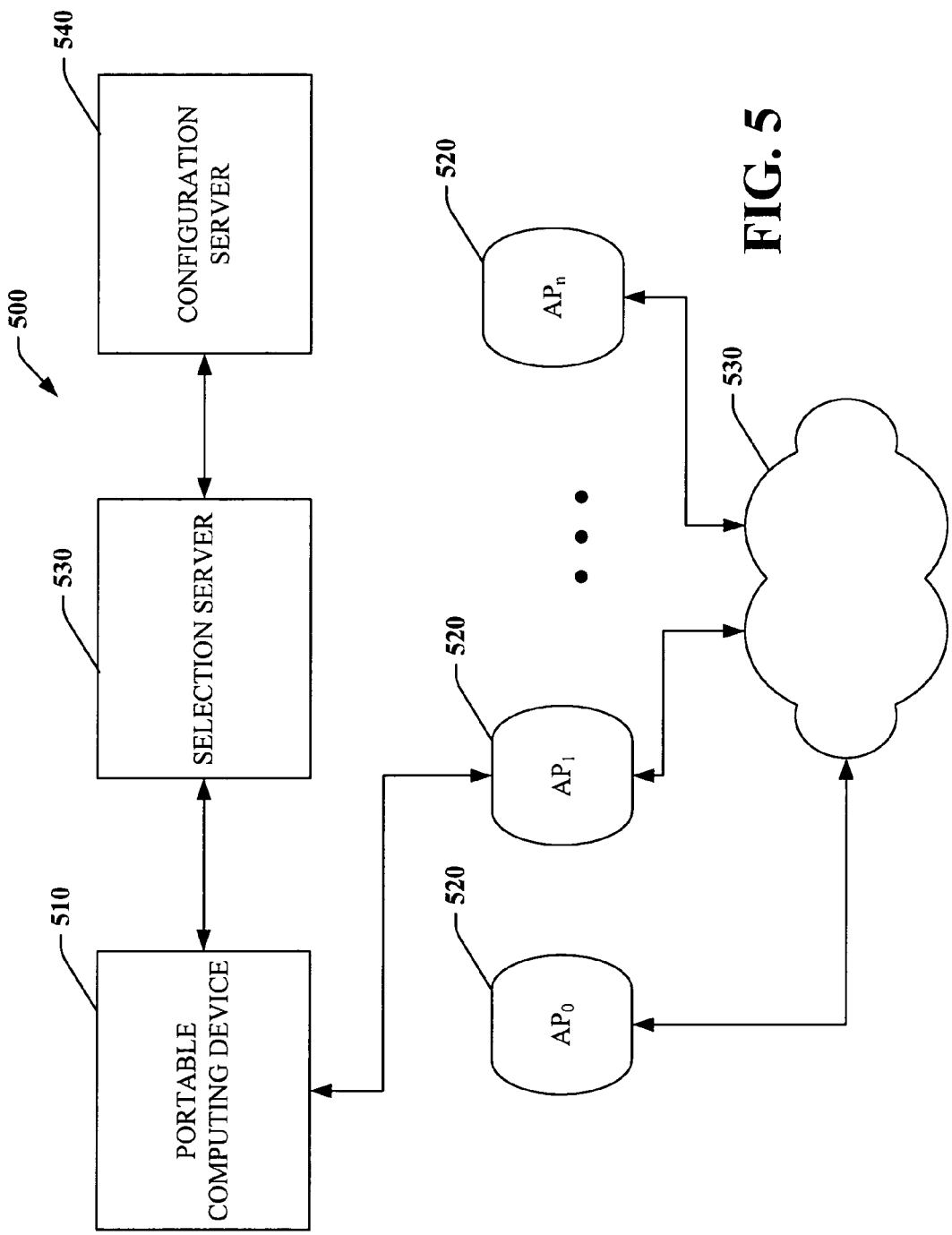
FIG. 5 is a system block diagram of a portable computing device configuration system.

FIG. 5 is a system block diagram of a portable computing device configuration system 500. The portable computing device configuration system 500 includes a portable computing device 510. The portable computing device 510 is capable of accessing one of a group of access points 520. Each of the access points 520 provides a data communication entry point to a network 530.

The portable computing device 510 can access a selection server 530. The selection server 530 provides a selection service to determine which of multiple access points, such as the access points 520, the portable computing device 510 should join. Such selection can be based upon a number of determining criteria. First, the selection server 530 can take into account whether the portable computing device is capable of, or authorized to, join all of the available access points. A negative determination will reduce the number of members in a set of access points from which the selection server can choose.

A second criterion includes quality of a connection between the portable computing device and one of the access points 520. For example, the portable computing device 510 may be closer to one of the access points 520 than to another one of the access points 520. In this case, strength of a wireless data communication signal from the portable computing device 510 to each of the access points 520 will differ from access point to access point. The selection server 530 can determine which access point the portable computing device 510 should join based upon signal strength. Other determining criteria can also be used.

The selection server 530 can choose an access point of the group of access points 520 to which the portable computing device 510 should connect and obtain appropriate configuration information from the configuration server 540. The configuration server 540 can send the configuration information to the portable computing device 510. The portable computing device 510 can then configure its internal network components to connect to the access point 520 that was selected by the selection server 530.

Figure 6:
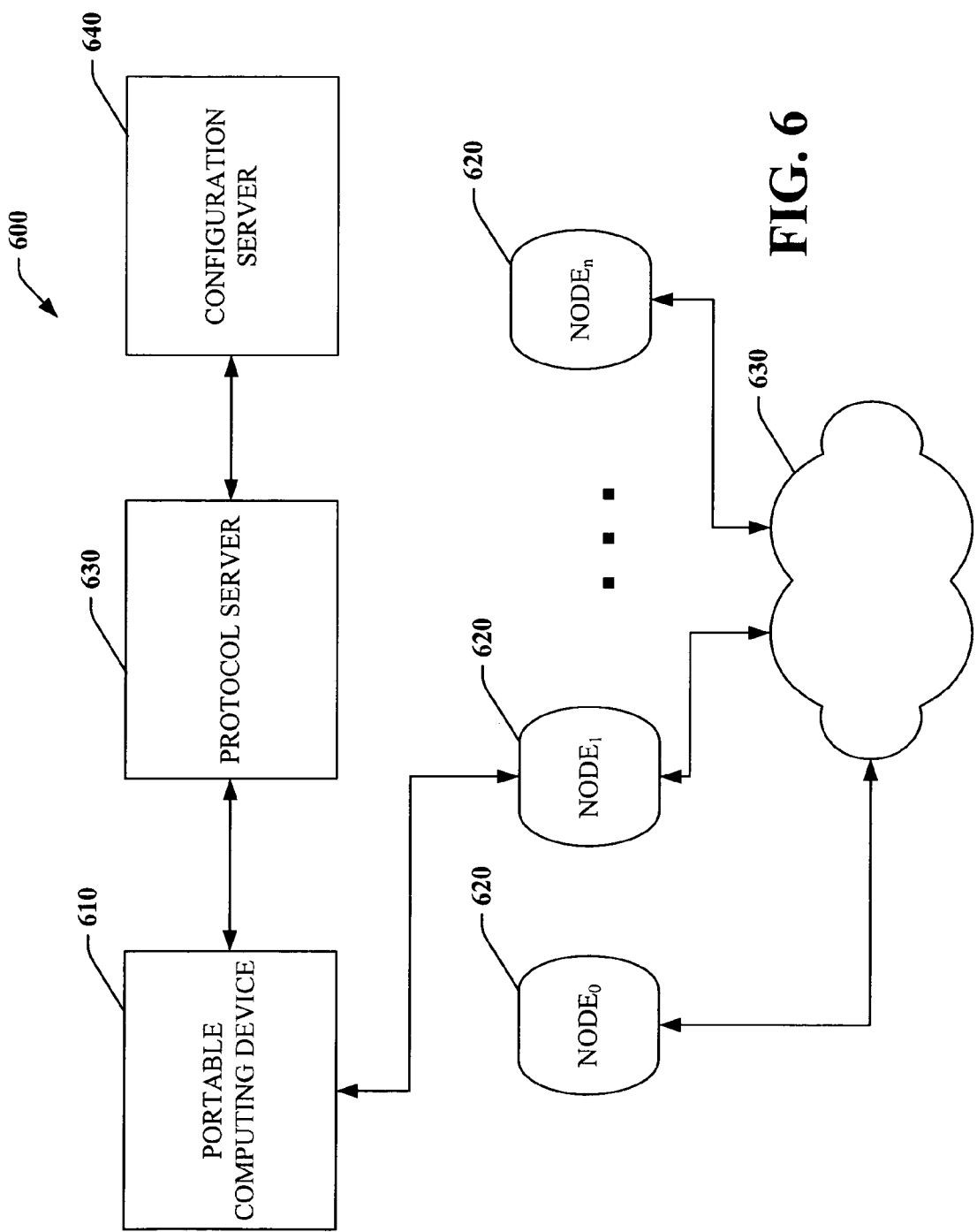
FIG. 6 is a system block diagram of a network configuration system.

FIG. 6 is a system block diagram of a network configuration system 600. The network configuration system 600 includes a portable computing device 610 that is capable of connecting to any one of a group of nodes 620. Each node of the group of nodes 620 can provide a point of access to a network 630. In this specific example, each of the nodes of the group of nodes 620 can provide connectivity using a different communication protocol. For example, one of the nodes can be a WiFi access point while another node can be a CDMA network tower.

The portable computing device 610 can send the configuration request to a protocol server 640. The configuration request can include a list of communication protocols that are in use by the nodes 620. The protocol server 640 can use this list to determine which protocol, from among the available protocols, the portable computing device 610 should use. This determination can be made on the basis of a predefined scheme or hierarchy of protocol preferences. For example, if the portable computing device 610 is a telephone that has both cellular communication capabilities and WiFi communication capabilities, a possible preference is to connect using WiFi communication whenever possible and to only use a cellular protocol if the WiFi access point is not available.

The protocol server 640 can use its choice of a protocol to obtain appropriate configuration information from a configuration server 650. The configuration server 650 can send the configuration information to the portable computing device 610. The portable computing device 610 can use the configuration information to set its internal communication parameters and thereby connect to the proper one of the group of nodes 620.

The disclosed and described components, for example in connection with identification tasks, can employ various artificial intelligence-based schemes for carrying out various aspects thereof. For example, identification of a portable computing device or a user can be carried out by a neural network, an expert system, a rules-based processing component, or an SVM.

A classifier is a function that maps an input attribute vector, $X=(x_1, x_2, x_3, x_4, \ldots x_n)$, to a confidence that the input belongs to a class, that is, $f(X)=\text{confidence}(\text{class})$. Such a classification can employ a probabilistic and/or statistical-based analysis (for example, factoring into the analysis utilities and costs) to prognose or infer an action that a user desires to be automatically performed. In the case of a configuration system, for example, attributes can be file descriptors such as filenames, signatures, hash functions, upgrade codes, compatibility codes, version numbers, build numbers, release dates, or other data-specific attributes derived from configuration files and the classes are categories or areas of interest, for example, descriptors of other components that the device can use.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, the subject invention can employ classifiers that are explicitly trained (for example, by a generic training data) as well as implicitly trained (for example, by observing user behavior, receiving extrinsic information). For example, SVMs are configured by a leaning or training phase within a classifier constructor and feature selection module. Thus, the classifier(s) can be used to automatically perform a number of functions including but not limited to determining whether a device should be sent data.

Portable mobile devices may be transported from network to network or may be called upon to join an ad hoc network. Consequently, these devices may need to obtain configuration information for multiple networks and determine which network to join from among multiple available networks. To accommodate such needs, certain types of networks (for example, ad hoc or access point) are preferred over other types and within a network type, specific networks are preferred over others. In this regard, the structuring of configuration data as an XML file is useful. Within the XML structure, the order in which network configuration information is presented can be employed to create a ranked network preference list. A preferred method of accomplishing this ranking is to follow a convention that the first listed network is the least preferred. Subsequent networks are preferred more until the last, or most-preferred network, is listed. In this way, the most recent configuration information can be appended to the end of the XML file and will represent the most preferred network. This method may also be employed to amend configuration information for a network simply by appending a new entry for that network to the XML file.

It should be appreciated that the components and methods described provide general frameworks for device configuration management. Among the uses for such components and methods are initial and updated configuration of groups of homogeneous or heterogeneous devices having wireless networking capabilities. Also possible is an ability to query a device (or group of devices) to determine a current configuration state and based upon that state, determine whether to send new or additional configuration information to the device. One additional benefit is the ability to automatically configure large numbers of devices using batch-processing techniques.

With reference to FIGS. 7-10, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 7:
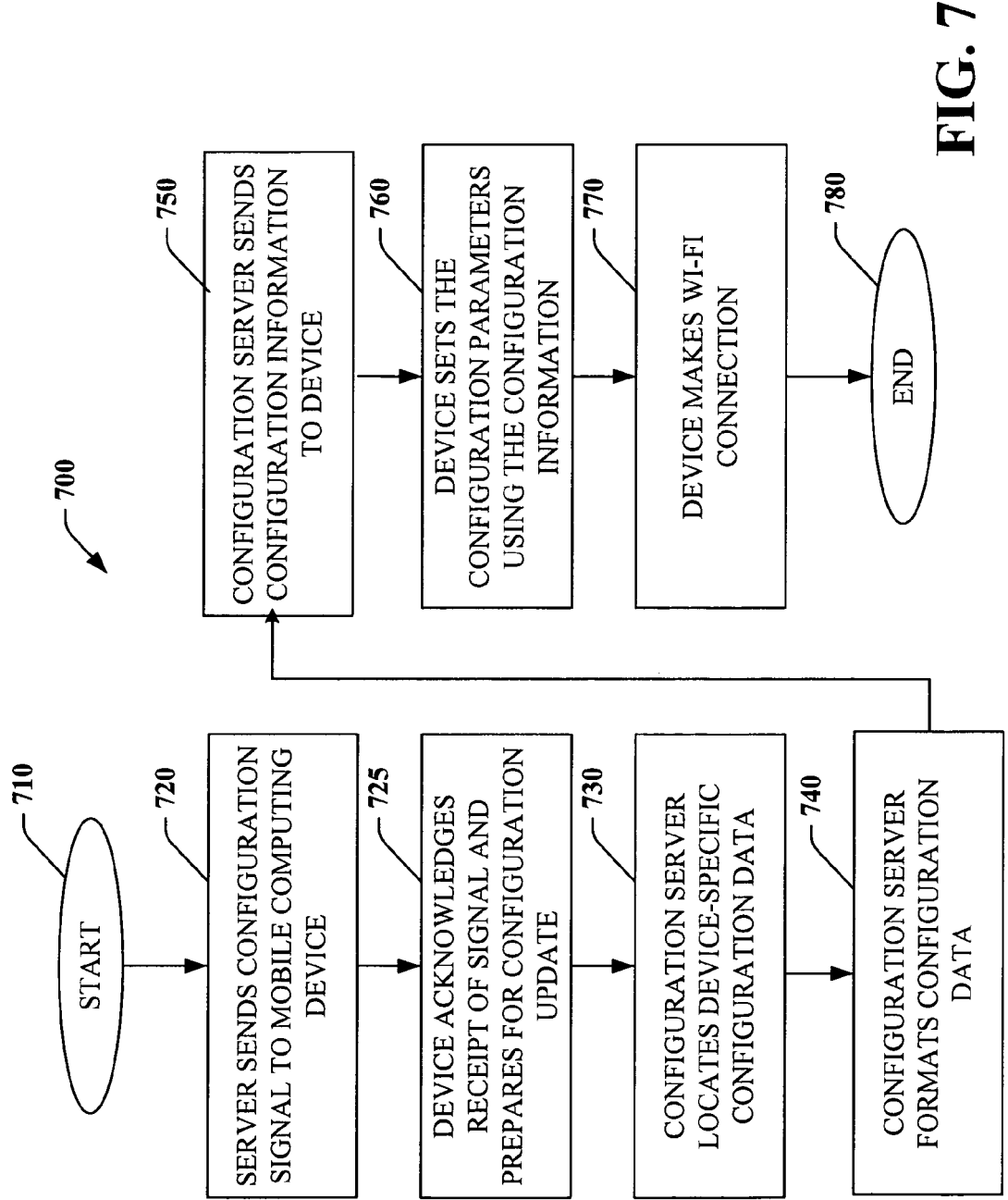
FIG. 7 is a flow diagram depicting a high-level method of operating a configuration system.

FIG. 7 is a flow diagram depicting a high-level method 700 of operating a configuration system. Operation of the method begins at START block 710 and continues to process block 720 where a configuration server sends a configuration signal to a portable computing device. Processing continues at process block 730 where the configuration server locates and accesses configuration data for, and specific to, the requesting device. At process block 740, the configuration server arranges the configuration data for the requesting device into a suitable format. The configuration server then sends the formatted configuration data to the requesting device at process block 750.

Upon receiving the data from the configuration server, at process block 760 the portable computing device sets its internal network access parameters using the configuration data. At process block 770, the portable computing device uses the set parameters to access a wireless network, such as an IEEE 802.11x network. Processing concludes at END block 780.

Figure 8:
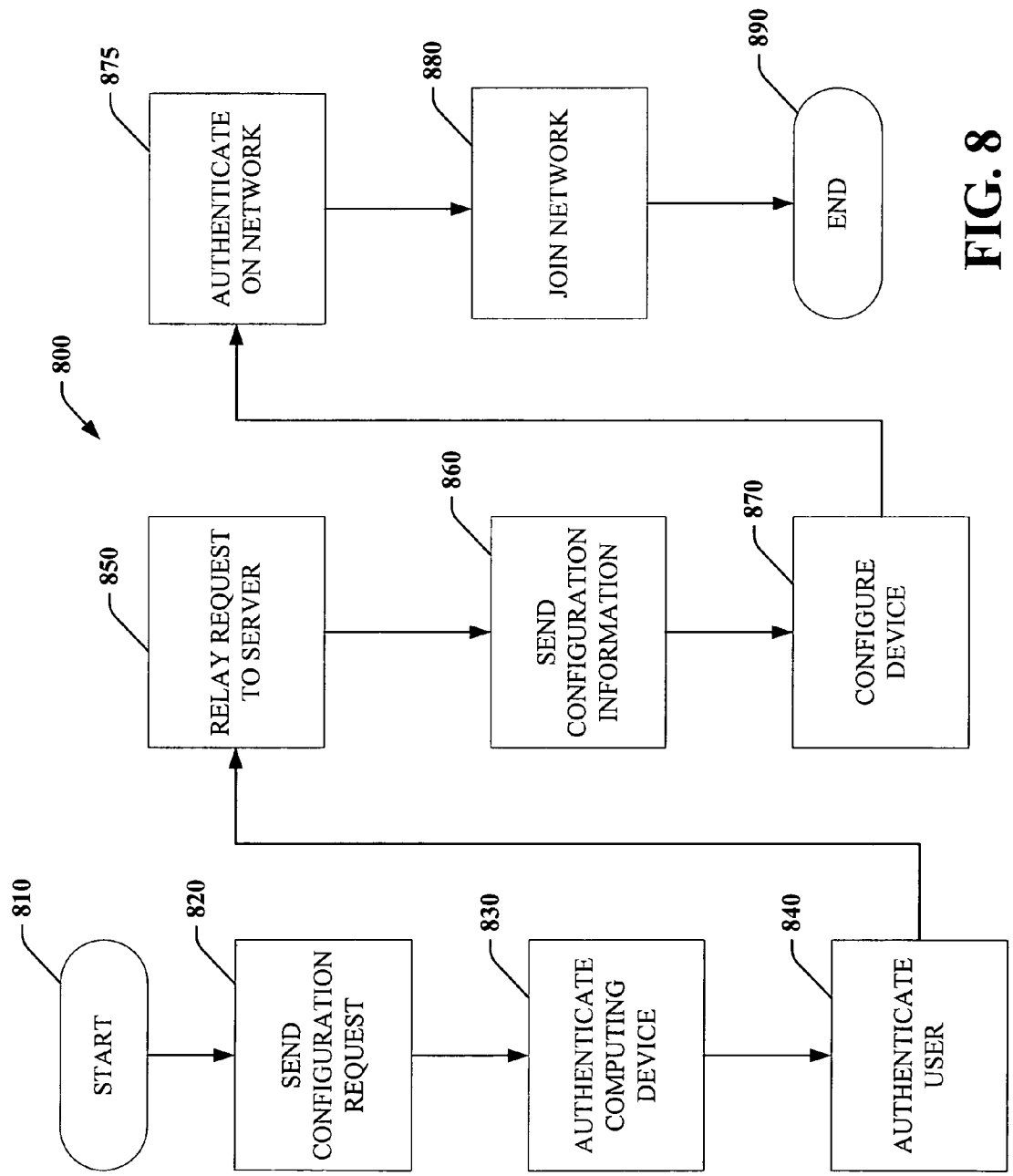
FIG. 8 is a flow diagram of a method that can be employed.

FIG. 8 is a flow diagram of a method 800 that can be employed. Processing begins at START block 810 and continues to process block 820. At process block 820, a configuration server sends a configuration request to a mobile computing device. At process block 830, the mobile computing device is authenticated. Authentication of the mobile computing device can be performed by accessing a unique identifier of the mobile computing device and comparing that identifier to entries in a list of identifiers that are associated with known authorized devices. If the unique identifier of the mobile computing device occurs in the list of known or trusted devices, the mobile computing device is authenticated. Other methods of authenticating the mobile computing device, including accessing descriptors of sub-components of the mobile computing device, can also be used.

At process block 840, a user of the mobile computing device is authenticated. User authentication can be performed by a variety of methods, including methods that are consistent with security paradigms of what you know, what you have, and who you are. In the category of what you know are user name and password schemes. The category of what you have includes systems that use security tokens, such as tokens that periodically generate a password and that are keyed to an authentication server. Systems that rely on who you are include biometric authentication systems such as fingerprint systems, retina scan systems, and other analogous authentication systems.

A request that originated from an authenticated device that is being operated by an authenticated user is relayed to a configuration server at process block 850. Processing continues to process block 860 where configuration information that is responsive to the configuration request from the mobile computing device is sent to that device. At process block 870, the mobile computing device uses the configuration information to configure its communication parameters. Authentication of the mobile computing device on a network for which the mobile computing device was configured occurs at process block 875. The mobile computing device joins a network at process block 880. Processing concludes at END block 890.

Figure 9:
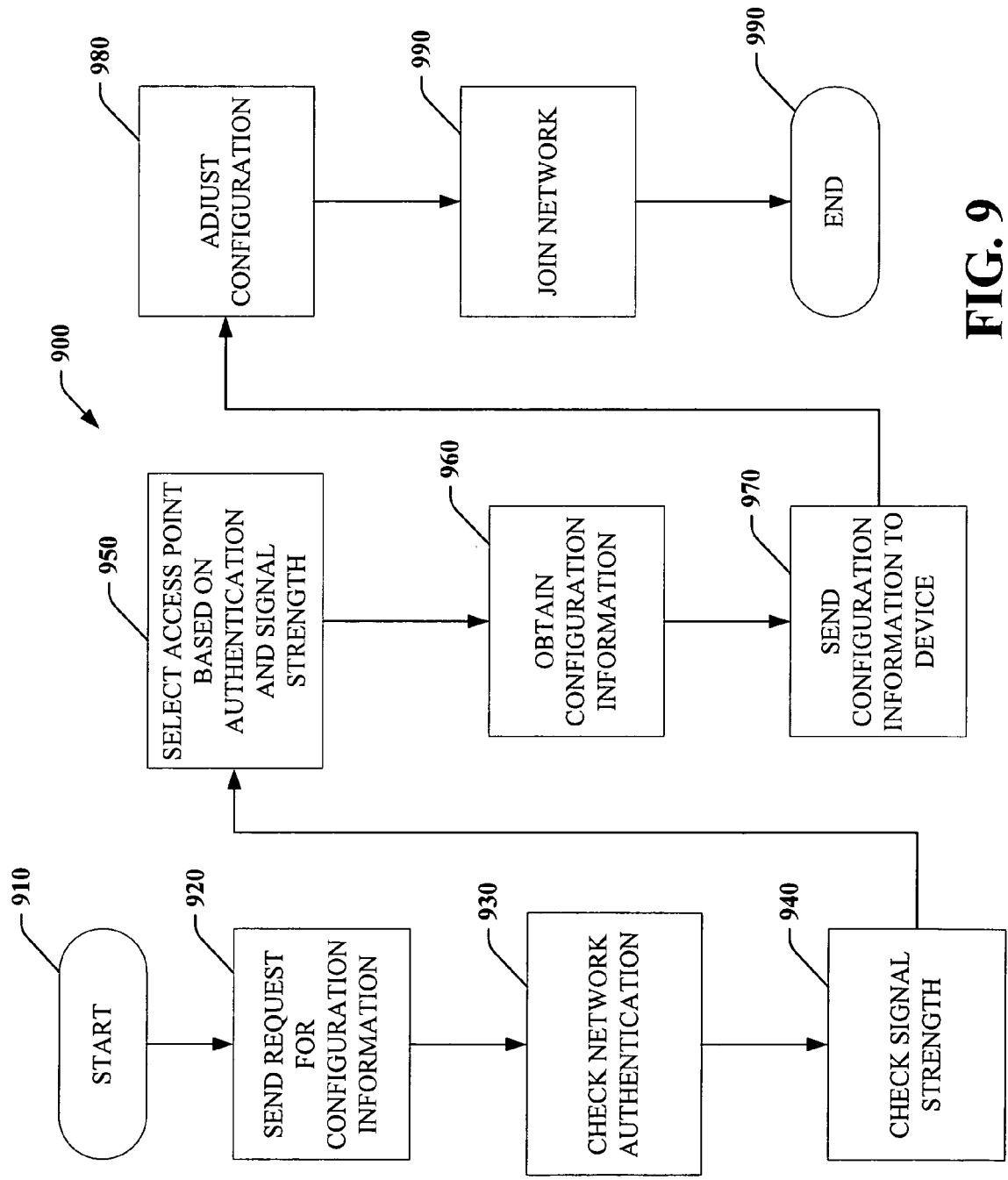
FIG. 9 illustrates execution of a method that can be used.

FIG. 9 illustrates execution of a method 900 that can be used. Processing of the method 900 begins at START block 910 and continues to process block 920. A mobile computing device sends a configuration information request to a configuration server at process block 920. Processing continues to process block 930 where an ability of the mobile computing device to join a network is checked. The ability of the mobile computing device to join a network can include both the existence of hardware components of the mobile computing device that are sufficient to support a communication protocol being used by desired network and the existence of sufficient software or hardware components or permissions to join the desired network.

At process block 940, signal strength of one or more access points that are associated with a desired network is checked. An access point is selected at process block 950. The selection of the access point can be based upon signal strength or on another factor. At process block 960, configuration information for the selected access point is obtained. Processing continues at process block 970 where the configuration information is sent to the mobile computing device.

The mobile computing device uses the configuration information it received to adjust its internal networking parameters at process block 980. At process block 990, the mobile computing device uses the newly adjusted networking parameters to join a network. Processing concludes at END block 995

Figure 10:
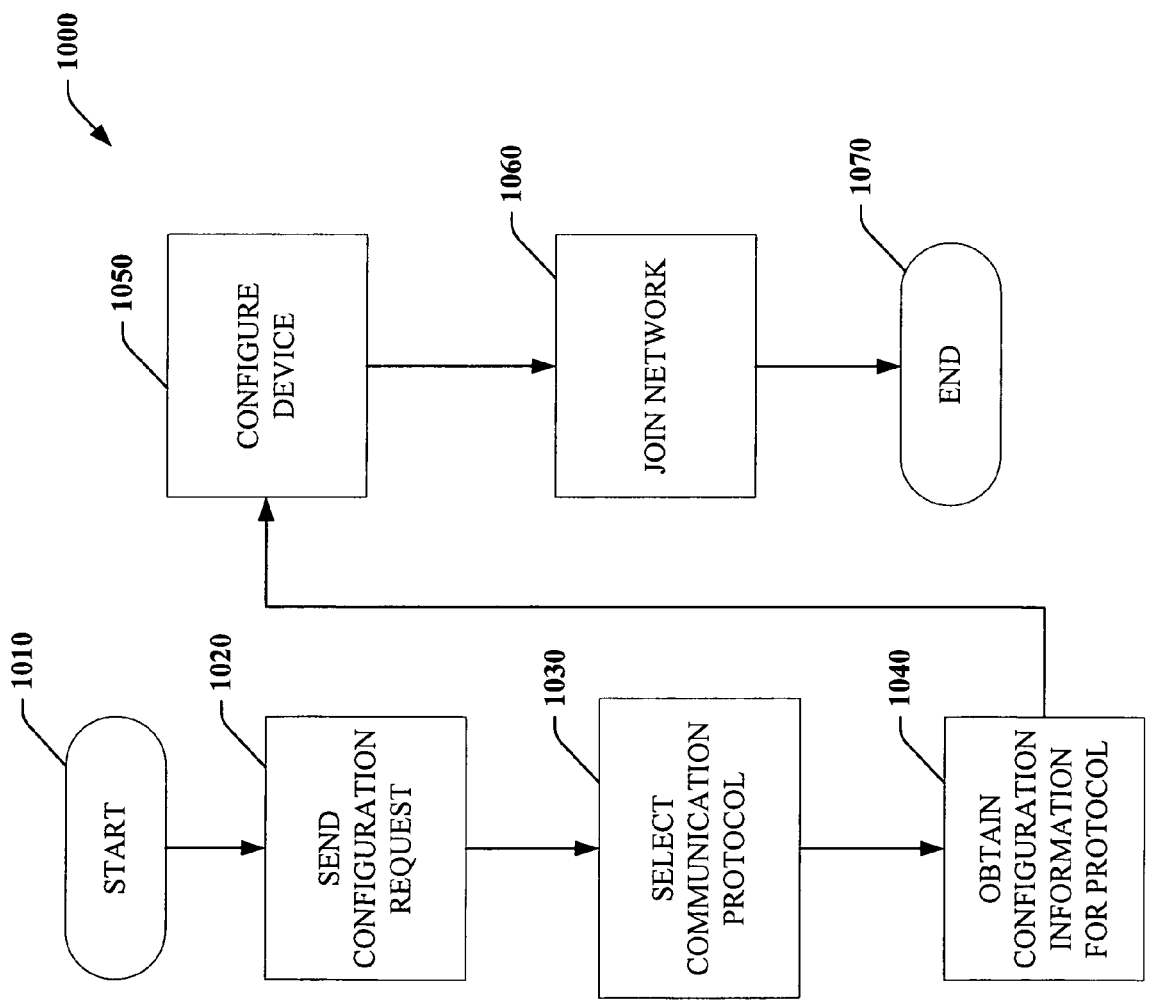
FIG. 10 illustrates execution of a method that can be employed.

FIG. 10 illustrates execution of a general processing method 1000 that can be employed. Processing of the method 1000 begins at START block 1010. Processing continues to process block 1020 where a portable computing device sends a request for configuration information to a configuration server. In this example, the request for configuration information includes a list of protocols are in use or supported by network nodes in the vicinity of the portable computing device. For instance, the portable computing device can be within range of a group of network nodes that support communications based on WiFi, WiMax, Bluetooth, CDMA, TDMA, or GSM, among others.

At process block 1030, selection of a communication protocol that the portable computing device is to use occurs. Processing continues to process block 1040 where configuration information for a network node that supports this selected communication protocol is obtained. At process block 1050, the portable computing device uses the configuration information to update its internal networking information. At process block 1060, the portable computing device uses it's updated networking information to join a network. Processing concludes at END block 1070.

Figure 11:
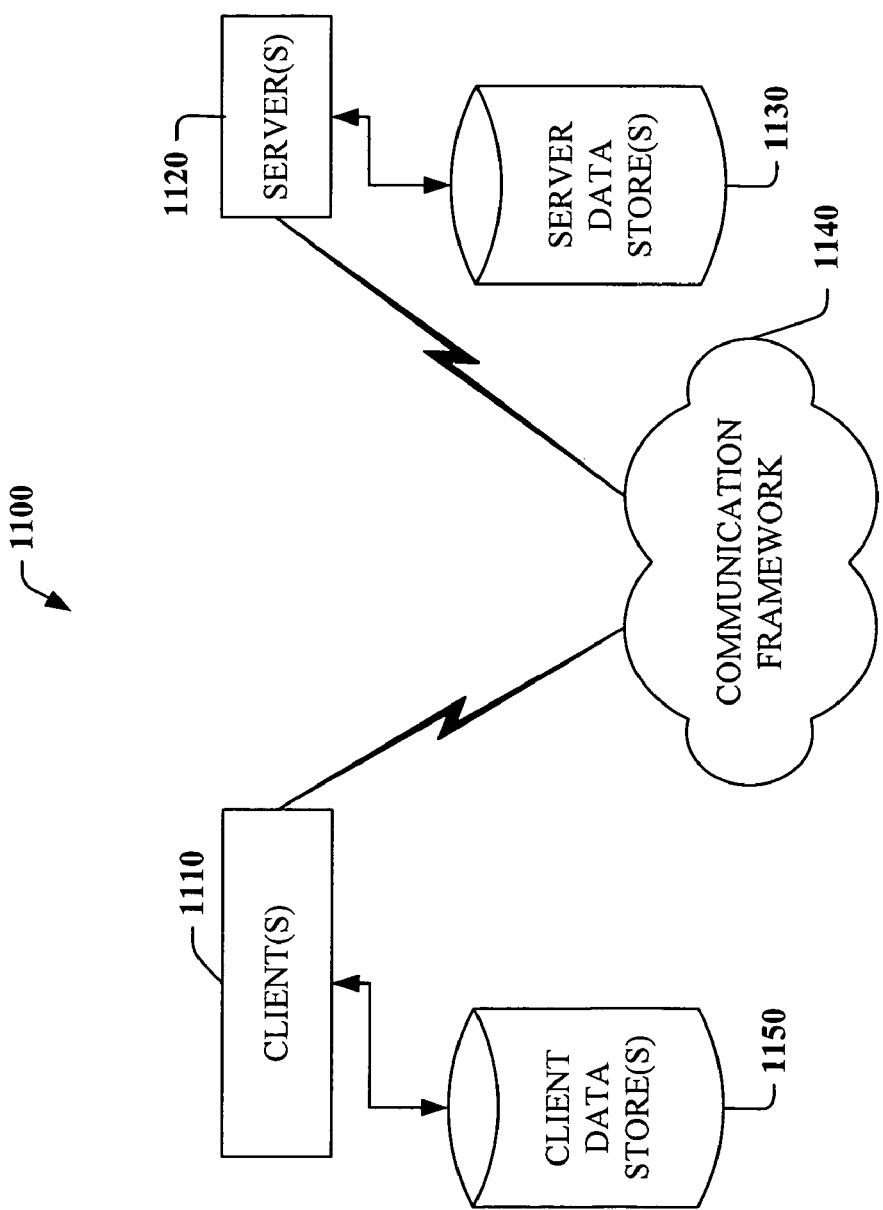
FIG. 11 illustrates an exemplary networking environment.
Figure 12:
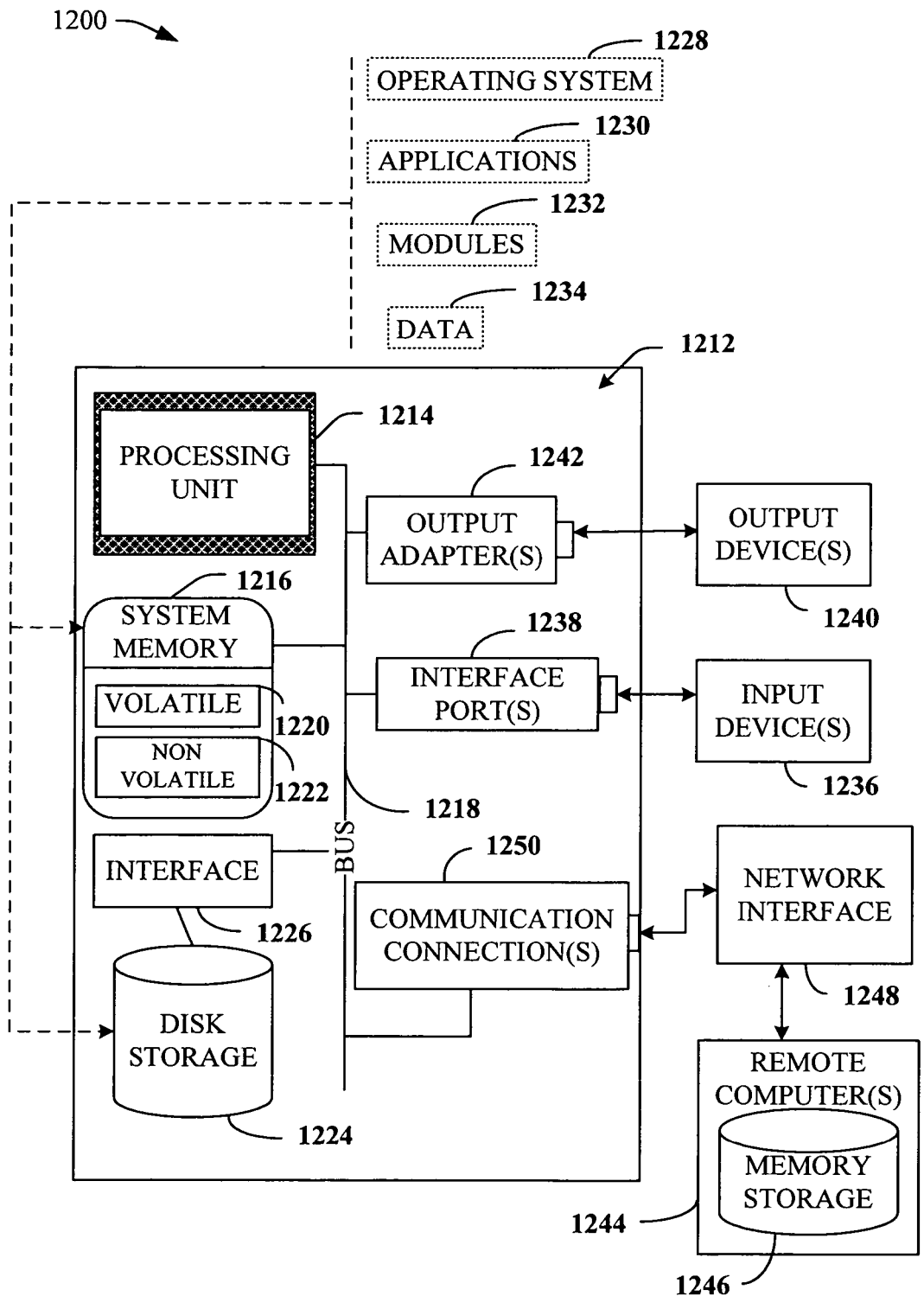
FIG. 12 illustrates an exemplary operating environment.

In order to provide additional context for implementation, FIGS. 11-12 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 11 is a schematic block diagram of a sample-computing environment 1100 within which the disclosed and described components and methods can be used. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The server(s) 1120 can house threads or processes to perform transformations by employing the disclosed and described components or methods, for example. Specifically, one component that can be implemented on the server 1120 is a configuration server, such as the configuration server 110 of FIG. 1. Additionally, various security or authentication modules, such as the authentication module 430 discussed in conjunction with FIG. 4, can also be implemented as components of the server 1120. Various other disclosed and discussed components can be implemented on the server 1120.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1140.

With reference to FIG. 12, an exemplary environment 1200 for implementing various components includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

The various types of volatile and non-volatile memory or storage provided with the computer 1212 can be used to store components of various implementations of the data port signaling system disclosed and described herein. For example, with reference to FIG. 1, the configuration data store 150 can be implemented as a software module in the non-volatile memory 1222. At runtime, information from the configuration data store 150 can be loaded into the volatile memory 1220 from where machine-interpretable code of the firmware 160 can be accessed by the processing unit 1214 and thereby placed into execution.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the disclosed components and methods can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. The interface ports 1238 specifically can include various data connection ports that can be used with components disclosed and described herein, among others.

Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for providing configuration information to a portable computing device, comprising:
    a processor and a memory, wherein:
        the processor receives a configuration request signal from the portable computing device over a first communication channel;
        the processor accesses, via the memory, configuration data for the portable computing device, wherein the configuration data includes network access parameter information for at least one portable computing device and at least one network; and
        the processor sends, via the first communication channel, network access parameter information to the portable computing device in a form usable by the portable computing device to set network access parameters that allow the portable computing device to access a network via a second communication channel.

2. The system of claim 1, wherein the network access parameter information includes a network type parameter and a network identifier parameter.

3. The system of claim 2, wherein the network type parameter is one of an ad hoc identifier and an access point identifier.

4. The system of claim 3, wherein the network type parameter is an ad hoc identifier and the ad hoc identifier includes at least one of a key data identifier, a key index identifier, an authentication identifier, an encryption identifier, and a vendor-specific identifier.

5. The system of claim 3, wherein the network type parameter is an access point identifier and the access point identifier includes at least one of an extensible authentication protocol identifier, a key index identifier, a key data identifier, an authentication identifier, an encryption identifier, a destination identifier, and a vendor-specific identifier.

6. The system of claim 3, wherein the form that is usable by the portable computing device to set network access parameters is an extensible markup language (XML) file.

7. The system of claim 3, further comprising an authentication module that verifies ability of the portable computing device to access a network.

8. The system of claim 3, wherein the communication module sends the network access parameter information by OMA-DM protocol.

9. A computer-implemented method for providing configuration information to a computing device, comprising:
receiving, via a first communication channel, a configuration request signal from the computing device;
accessing a memory comprising configuration data that includes network access parameter data for at least one computing device and at least one network; and
sending, via the first communication channel, the network access parameter data to the computing device in a form usable by the computing device to set network access parameters that allow the computing device to access a network via a second communication channel.

10. The method of claim 9, wherein sending the network access parameter data to the computing device in a form that is usable by the computing device includes sending an extensible markup language (XML) file.

11. The method of claim 10, wherein receiving a configuration request signal includes using a first communication channel.

12. The method of claim 11 wherein sending the network access parameter data includes sending network access parameter data that is related to a second communication channel that is different from the first communication channel.

13. The method of claim 12, wherein using the first communication channel includes using a short message system (SMS) channel.

14. The method of claim 11, wherein sending network access parameter data that is related to a second communication channel includes sending network access parameter data that is related to a wireless internet protocol-based channel.

15. A system for providing configuration information to a portable computing device, comprising:
means for receiving at a processor a configuration request signal from a portable computing device via a first wireless communication channel, where the computing device is communicating with the processor via the first wireless communication channel;
means for accessing network access parameter data, retained in a memory, to be employed by the portable computing device to access a network; and
means for sending the network access parameter data by OMA-DM protocol to the portable computing device in a form that is usable by the portable computing device to set network access parameters that allow the portable computing device to access the network via a second communication channel, the network access parameter data is sent to the computing device via the first wireless communication channel.

16. The system of claim 15, wherein the form that is usable by the portable computing device to set network access parameters is an extensible markup language (XML) file.

17. The system of claim 16, wherein the configuration request signal is received using a first communication channel.

18. The system of claim 17 wherein the network access parameter data is related to a second communication channel that is different from the first communication channel.

19. The system of claim 18, wherein the first communication channel is a short message system (SMS) channel.

20. The system of claim 19, wherein the second communication channel is a wireless internet protocol-based channel.

21. A computer implemented method for providing configuration information to a portable computing device, comprising:
receiving a configuration request signal from the portable computing device over a first communication channel;
accessing configuration data, including network access parameter data for at least one portable computing device and at least one network;
determining an access point available to the portable computing device;
determining a communication protocol available via the access point;
sending, via the first communication channel, network access parameter data and information identifying the access point and the communication protocol to the portable computing device in a form usable by the portable computing device to set network access parameters that allow the portable computing device to access a network via a second communication channel.

* * * * *